United States Patent
Akagi et al.

(10) Patent No.: US 6,483,660 B1
(45) Date of Patent: Nov. 19, 2002

(54) DISK DRIVE UNIT HAVING MULTIPLE DISKS ARRANGED IN A PLANE

(75) Inventors: Kyo Akagi, Fuchu (JP); Toshihisa Tsukada, Musashino (JP); Yoshihiro Shiroishi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 986 days.

(21) Appl. No.: 08/992,083

(22) Filed: Dec. 17, 1997

Related U.S. Application Data

(63) Continuation of application No. 08/398,803, filed on Mar. 6, 1995, now abandoned.

(30) Foreign Application Priority Data

Mar. 8, 1994 (JP) .............................................. 6-036722

(51) Int. Cl.[7] .............................. G11B 5/54; G11B 25/04
(52) U.S. Cl. .................................................... 360/98.01
(58) Field of Search ........................ 360/97.01, 98.01, 360/98.07, 98.08, 99.12, 105

(56) References Cited

U.S. PATENT DOCUMENTS

| | | | |
|---|---|---|---|
| 3,553,662 A | 1/1971 | Goss ........................ | 360/98.01 |
| 3,864,750 A | 2/1975 | Applequist .................. | 360/105 |
| 3,984,873 A | 10/1976 | Pejcha ..................... | 360/98.01 |
| 4,733,145 A | * 3/1988 | Ohashi et al. ................ | 318/54 |
| 4,924,770 A | * 5/1990 | Raub ........................... | 99/511 |
| 5,390,313 A | 2/1995 | Yanai et al. ............. | 360/98.01 |
| 5,488,523 A | 1/1996 | Seaver et al. ............ | 360/99.12 |
| 5,500,779 A | 3/1996 | Diel ........................ | 360/97.01 |

FOREIGN PATENT DOCUMENTS

| | | |
|---|---|---|
| DE | A-3638911 | 5/1988 |
| JP | 56-80859 | 7/1981 |
| JP | 62-197975 | 9/1987 |
| JP | A-01311490 | 12/1989 |
| JP | A-03073482 | 3/1991 |

OTHER PUBLICATIONS

IBM Technical Disclosure Bulletin, vol. 37, No. 3, Mar. 1994, "Design to Densely Package Small Form Factor HDA", p. 467.
IBM Technical Disclosure Bulletin, vol. 33, No. 6B, "Disk Drive with Multiple Spindles", Nov. 1990.*

* cited by examiner

*Primary Examiner*—Jefferson Evans
(74) *Attorney, Agent, or Firm*—Antonelli, Terry, Stout, & Kraus, LLP.

(57) ABSTRACT

A magnetic disk unit of form factor size with a low power consumption, a short average seek time and a high performance. The unit includes at least two spindles for supporting and rotating magnetic disks. Specifically, two 1.3-inch disks, three 1.0-inch disks or four 0.7-inch disks are arranged in a housing originally intended for a 1.8-inch magnetic disk. The unit further includes a device for writing and reading information while selecting a spindle. The card-type disk unit thus can be reduced in thickness, with a smaller power consumption for starting the disk rotation and further with an improved average seek velocity.

7 Claims, 5 Drawing Sheets

DISK DRIVE UNIT HAVING MULTIPLE DISKS ARRANGED IN A PLANE

CROSS-REFERENCE TO RELATED APPLICATION

This application is a continuation of application Ser. No. 08/398,803, filed on Mar. 6, 1995, now abandoned, the entire disclosure of which is hereby incorporated by reference.

BACKGROUND OF THE INVENTION

The present invention relates to magnetic disks such as flexible magnetic disk units and rigid magnetic disk units.

The conventional magnetic disk unit comprises a spindle for supporting and rotating a magnetic disk, at least one magnetic disk, a magnetic head arranged in opposed relation to the surface of each magnetic disk for reading and writing signals and a positioner for holding and positioning the magnetic head, all the components being contained in a housing. A device of this type is disclosed in JP-A-62-197975.

Examination by the present inventors, however, shows that in the case where a disk having a diameter corresponding to a housing of predetermined size is driven in that housing, the reduction in the power required for disk rotation and the increase in seek velocity are limited.

SUMMARY OF THE INVENTION

The present invention has been developed in view of the aforementioned points, and the object thereof is to provide a magnetic disk unit which has a large capacity and a low power consumption as a whole.

In order to achieve the above-mentioned object, according to one aspect of the invention, there is provided a magnetic disk unit comprising a plurality of magnetic disks, a plurality of spindles for supporting and rotating the magnetic disks, a plurality of magnetic heads arranged face to face with the magnetic disk surfaces for reading and writing signals, at least one positioner for holding and positioning the magnetic heads, and a housing for accommodating the aforementioned component parts, wherein a plurality of the magnetic disks are arranged in the same plane without being overlapped in the housing of 11 mm or less in thickness.

According to another aspect of the invention, there is provided a magnetic disk unit comprising a housing which is, for example, for PCMCIA (Personal Computer memory-card International Association) Standard of PC card size: 54.0±0.1×85.6±0.1×5.0 or less (Type II), 54.0±0.1×85.6±0.1×3.3±0.2 (Type I) (m/m), originally intended to accommodate a magnetic disk with a side having a predetermined data area, wherein a plurality of magnetic disks each smaller in diameter than the PCMCIA size's magnetic disk are arranged in a plane within the housing, the magnetic disks having a total one-side data area equal to the one-side data area of the originally-intended magnetic disk.

According to still another aspect of the invention, there is provided a magnetic disk unit comprising at least two rotating mechanisms (spindles) in the housing and means for reading and writing information by selecting the rotating mechanisms.

The rotating mechanisms (spindles) are preferably arranged in a plane in the housing in order to achieve a thin structure of the disk unit. For example, a housing originally built for a 1.8-inch size disk is preferably adapted to accommodate two 1.3-inch magnetic disks, three 1.0-inch magnetic disks, or four 0.7-inch magnetic disks arranged in a plane.

Preferably, each positioner for holding and placing magnetic heads in position is separately configured in association with each magnetic disk spindle, or each positioner is shared by each one of groups of several magnetic disk spindles.

The outer dimensions of the housing for accommodating a plurality of magnetic disks in a plane may be not more than approximately 55 mm by not more than approximately 86 mm with a thickness of not more than approximately 5.0 mm or not more than approximately 55 mm by not more than approximately 86 mm with a thickness of not more than approximately 3.5 mm.

The thickness dimension of a magnetic disk is determined on the basis of various parameters:

(a) spindle thickness s+casing thickness ca
(b) disk thickness d+2×(head thickness (h))+casing thickness ca
(c) positioner thickness p+casing thickness ca, or
(d) circuit thickness ci+casing thickness ca.

The two dimensions s in the above paragraph (a) and p in paragraph (c) will be provide obstacles to make the disk thinner. The structural feature of a plurality of pairs of a spindle and a positioner will present a small driving power and a small dimension of thickness for the disk unit according to an aspect of the invention.

The magnetic disks are preferably arranged in the same plane as and without overlapping with circuit boards including a data writing and reading circuit board, a signal processing unit (circuit) board and a circuit board for controlling the starting operation of the magnetic disk spindles and the magnetic head positioners.

The above-mentioned effects are derived from the following operation. According to the present invention comprising at least two spindles arranged in a housing and selected for writing and reading information, even though a plurality of magnetic disks are arranged in the same plane in a housing for writing and reading information, individual spindles can be rotated with a low torque without reducing the information recording area on the disk since the disk associated with each spindle is very small in diameter. Further, power consumption can be reduced by rotating only a specified disk as required. The use of a magnetic disk smaller than the form factor size generally used permits the use of a thinner motor and a thinner spindle. The structure of the disk unit can thus be reduced in thickness.

DESCRIPTION OF THE PREFERRED EMBODIMENTS

EMBODIMENT 1

Figure 1:
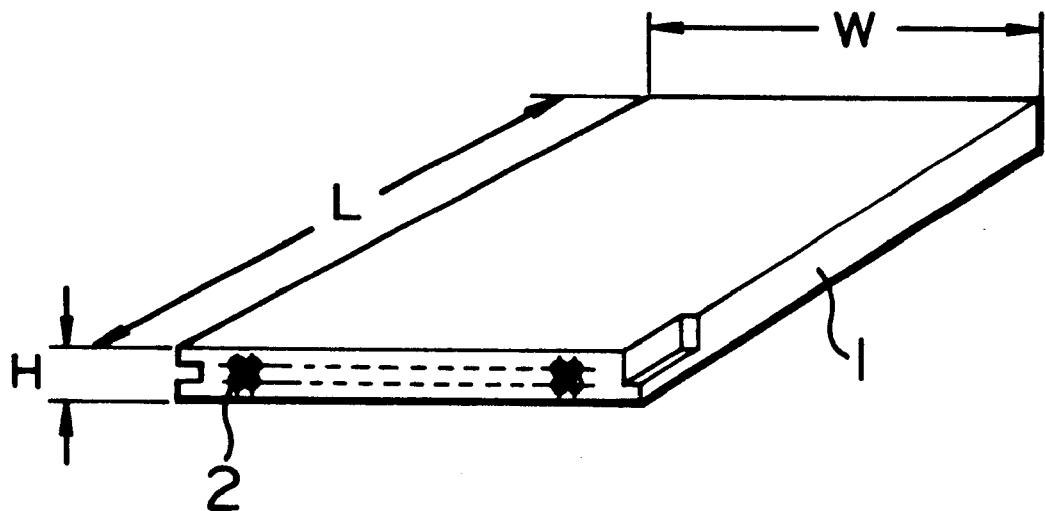
FIG. 1 is a diagram showing an outer appearance of a magnetic disk unit according to first to fourth embodiments of the invention.

FIG. 1 is a diagram showing the external appearance of a magnetic disk unit according to the first to fourth embodiments of the invention.

Figure 2:
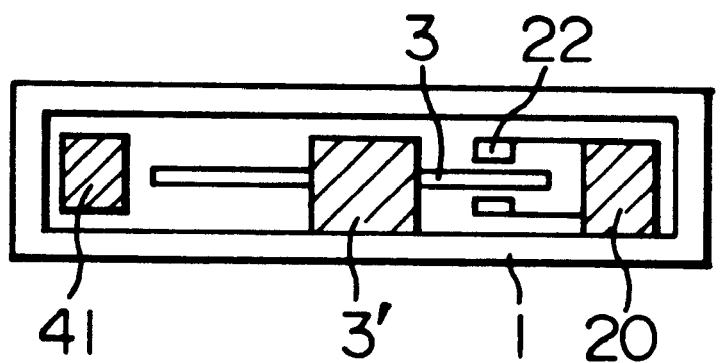
FIG. 2 is a sectional view of a magnetic disk unit.

FIG. 2 is a sectional view of a magnetic disk unit.

Figure 3:
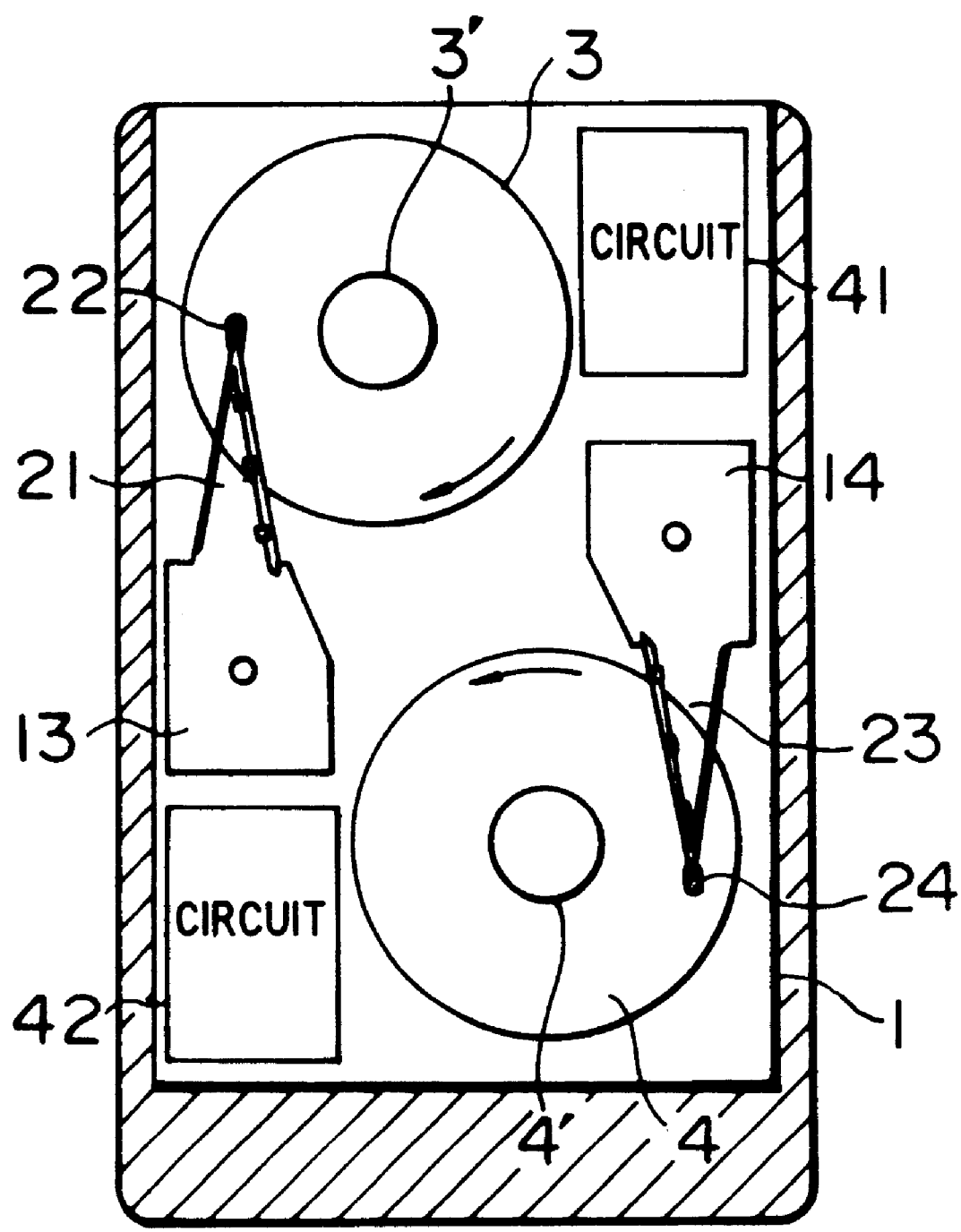
FIG. 3 is a diagram showing the configuration of a magnetic disk unit according to the first embodiment of the invention.

A connector 2 for electrically coupling the magnetic disk unit with external connection equipment is arranged at one end of the depth of a housing having a width W, a depth L and a thickness H. In the case under consideration, the magnetic disk unit is structured to contain the required parts thereof in the housing 1 having a width and depth adapted for a 1.8-inch disk with outer dimensions of 54 mm×85.6 mm×5.0 mm or 54 mm×85.6 mm×3.3 mm and having a thickness adapted for a PC card for PCMCIA Standard. The first embodiment of the invention is shown in FIG. 3.

A magnetic disk 3 is rotationally driven on a disk spindle 3'. A magnetic head 22, on the other hand, while being supported on a head support member 21, is adapted to randomly access the surface of the magnetic disk 3 by means of a head positioner 13. Further, a magnetic disk 4 is rotationally driven by a spindle 41', while a magnetic head 24 can randomly access the surface of the magnetic disk 4 by means of a head positioner 14 while being supported on a head support member 23. Circuit sections 41, 42 including an information writing and reading circuit and a control circuit described later are arranged in the space in the housing 1. These component parts are contained in a housing of the size shown in FIG. 1. The diameter of the disks 3 and 4 is approximately 33 mm (1.3 inch). What should be noted here is that the size of the head positioners 13, 14 is not required to be reduced proportionately to a size commensurate with the 1.3-inch unit, and provides the maximum size that can be accommodated in the housing. As a result, the driving torque of the head positioners is comparable to that of the head positioner of the 1.8-inch unit. The average seek time is improved by about 28% correspondingly due to the reduction in disk radius. Also, the power consumed for starting the disk is less than half that for the 1.8-inch disk, and therefore can be reduced by more than 50% for each disk. This is indicative of the fact that the maximum power consumption can be kept to less than one half that for the 1.8-inch disk unit by activating only one disk at the time of starting the disk operation. The disk rotation is preferably set in the direction designated by arrow in the drawing from the viewpoint of minimizing the air turbulence.

EMBODIMENT 2

Figure 4:
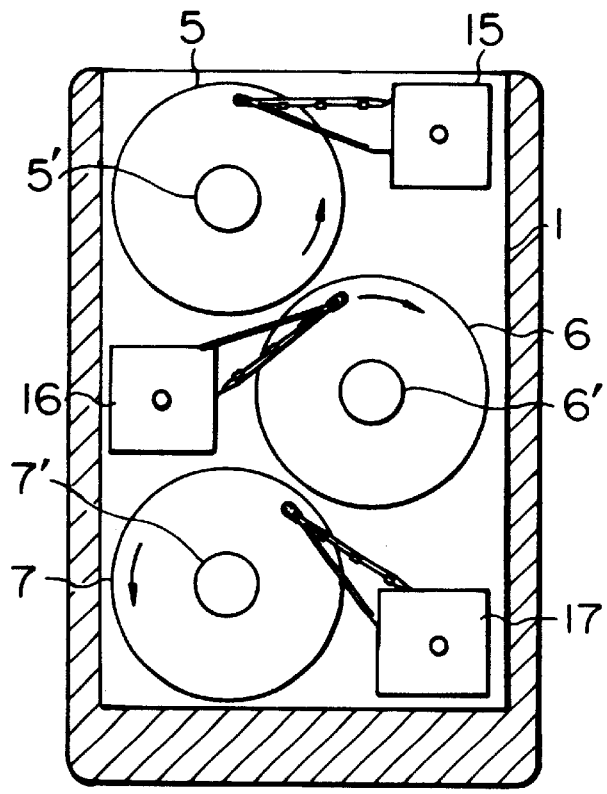
FIG. 4 is a diagram showing the configuration of a magnetic disk unit according to the second embodiment of the invention.

A second embodiment of the invention is shown in FIG. 4.

A magnetic disk 5 is rotationally driven by a disk spindle 5'. A magnetic head, while being supported on a head support member, can randomly access the surface of the magnetic disk 5 by means of a head positioner 15. A magnetic disk 6 is rotationally driven by a disk spindle 6', and a magnetic head, while being supported on a head support member, is capable of randomly accessing the surface of a magnetic disk 6 by means of a head positioner 6'. Further, a magnetic disk 7 is rotationally driven by a disk spindle 7', and a magnetic head, while being supported on a head support member, is adapted to access the surface of a magnetic disk 7 randomly by means of a head positioner 17. These parts are accommodated in a housing of the size shown in FIG. 1. The diameter of the disks 5, 6, 7 is approximately 25 mm (1.0 inch). It should be noted that the size of the head positioners 15, 16, 17 need not be reduced proportionately to a size commensurate with the 1.0-inch unit and provides the maximum size that can be accommodated in the housing. As a consequence, the driving torque of the head positioners is substantially comparable to that of the head positioner for the 1.8-inch unit. The average seek time thus is improved about 40% or an amount by which the disk radius is reduced. In addition, power consumed as a torque for starting the disk operation is less than one third that for the 1.8-inch disk unit, and therefore power consumption is reduced by more than 67% for each disk. This is indicative of the fact that the maximum power consumption can be reduced to less than one third of that for the 1.8-inch disk by activating only one of the disks in starting the disk operation. Further, the disk rotation is preferably set in the direction indicated by arrow in the drawing for the purpose of minimizing the air turbulence.

EMBODIMENT 3

Figure 5:
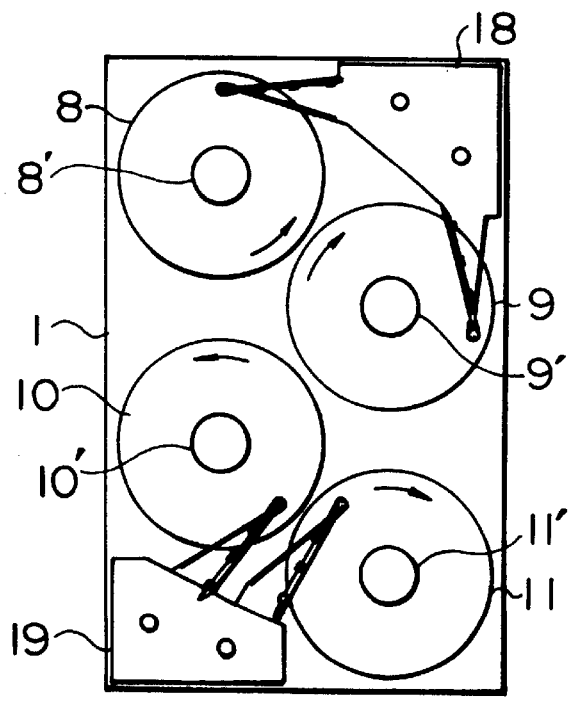
FIG. 5 is a diagram showing the configuration of a magnetic disk unit according to the third embodiment of the invention.

A third embodiment of the invention is shown in FIG. 5.

A magnetic disk 8 is rotationally driven by a disk spindle 8'. On the other hand, a magnetic head, while being supported on a head support member, is capable of randomly accessing the surface of the magnetic disk 8 by means of a head positioner 18. A magnetic disk 9 is rotationally driven by a disk spindle 9', and a magnetic head, while being supported on a head support member, is adapted to randomly access the surface of the magnetic disk 9 by means of the head positioner 18. Further, a magnetic disk 10 is rotationally driven by a disk spindle 10'. On the other hand, a magnetic head, while being supported on a head support member, is capable of randomly accessing the surface of the magnetic disk 9 by means of a head positioner 19. A magnetic disk 11 is rotationally driven by a disk spindle 11', and a magnetic head, while being supported on a head support member, can randomly access the surface of the magnetic disk 11 by means of the head positioner 19. These component parts are accommodated in a housing of the size shown in FIG. 1. The diameter of the disks 8, 9, 10, 11 is about 18 mm (0.7 inch). What should be noted here is that the size of the head positioners 18, 19 is not required to be reduced to a proportionately small size commensurate with the 0.7-inch unit, and provides the maximum size that can be accommodated in a housing. As a result, the driving torque of the head positioners is substantially comparable to that for the head positioner of the 1.8-inch unit. The average seek time thus is improved by about 60%, that is, by the amount of reduction in disk radius. Also, since the required starting torque is less than one fourth that for the 1.8-inch disk. The power consumption is thus reduced by more than 75% per disk. This is equivalent to saying that the maximum power consumption can be reduced to less than one fourth of the power required for the 1.8-inch disk unit by starting only one disk pair. Further, the direction of disk rotation is preferably set as shown by arrow, for example, from the viewpoint of minimizing the air turbulence.

EMBODIMENT 4

Figure 6:
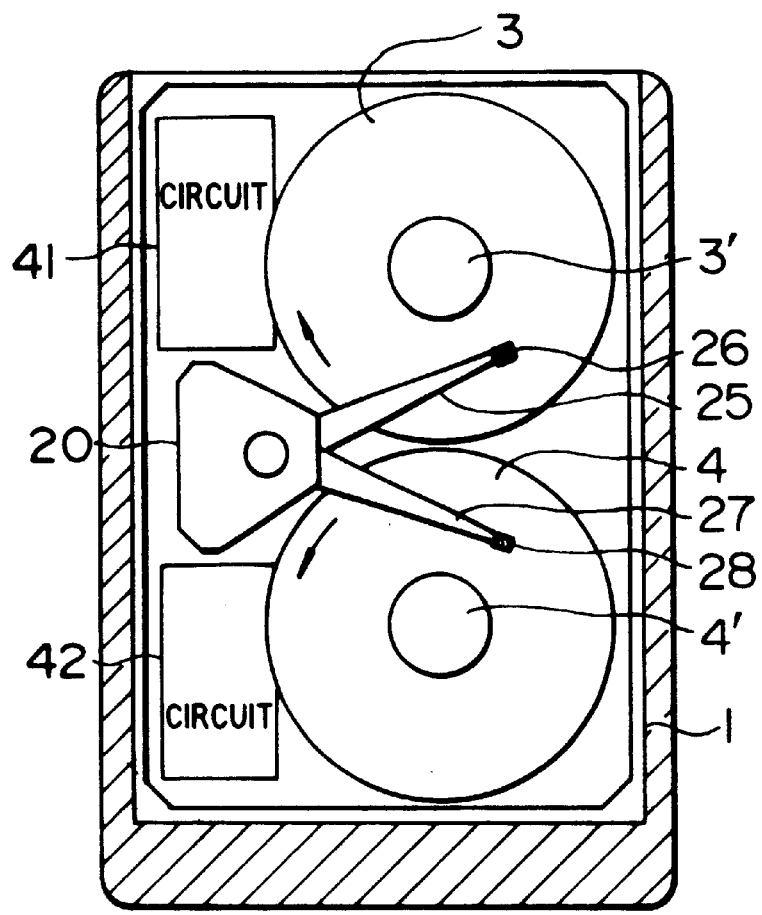
FIG. 6 is a diagram showing the configuration of a magnetic disk unit according to the fourth embodiment of the invention.

A fourth embodiment of the invention is shown in FIG. 6.

Figure 7:
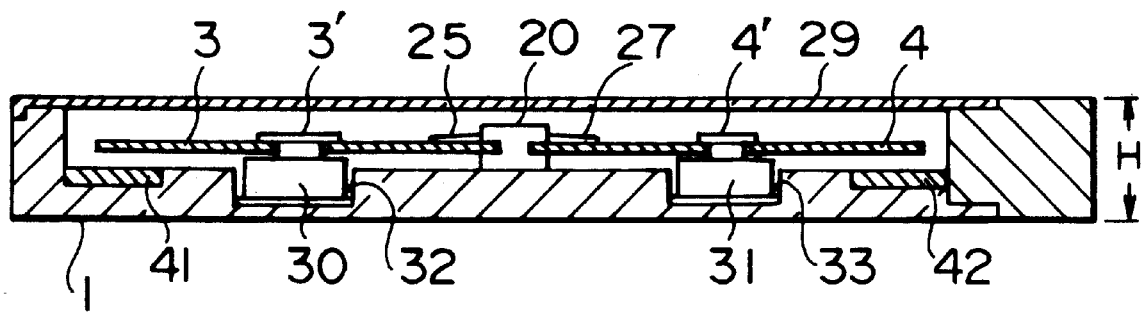
FIG. 7 is a sectional view showing a magnetic disk according to the first to fourth embodiments of the invention.

A magnetic disk 3 is rotationally driven by a disk spindle 3', and a magnetic head 26 while being supported on a head support member 25 is capable of randomly accessing the surface of the magnetic disk 3 by means of a positioner (head driving mechanism) 20. Further, a magnetic disk 4 is rotationally driven by a disk spindle 4', and a magnetic head 28, while being supported on a head support member 27, is adapted to randomly access the surface of the magnetic disk 4 by means of the positioner (head driving mechanism) 20. More specifically, two heads can access the surface of the respective disks through the same rotational axis and a common positioner. The circuit sections 41, 42 including an information writing and reading circuit and a control circuit described later are accommodated in the space in the housing 1. These circuit parts, as shown in the sectional views of FIG. 7 of the first to fourth embodiments of the invention, may be arranged partially under the disks. Also, disk driving motors 30, 31 are fitted in a recess formed in the housing 1. The structure shown in FIG. 7 is also shared by the first to third embodiments in addition to the fourth embodiment. These components are contained in a housing of the size shown in FIG. 1. The diameter of the disks 3, 4 is approximately 33 mm (1.3 inch). The same advantages as those derived from the disk pair of a similar construction of the first embodiment including the shorter average seek time, the reduced power consumption and the favorable direction of disk rotation can be achieved also according to the present embodiment.

FIFTH EMBODIMENT

Figure 8:
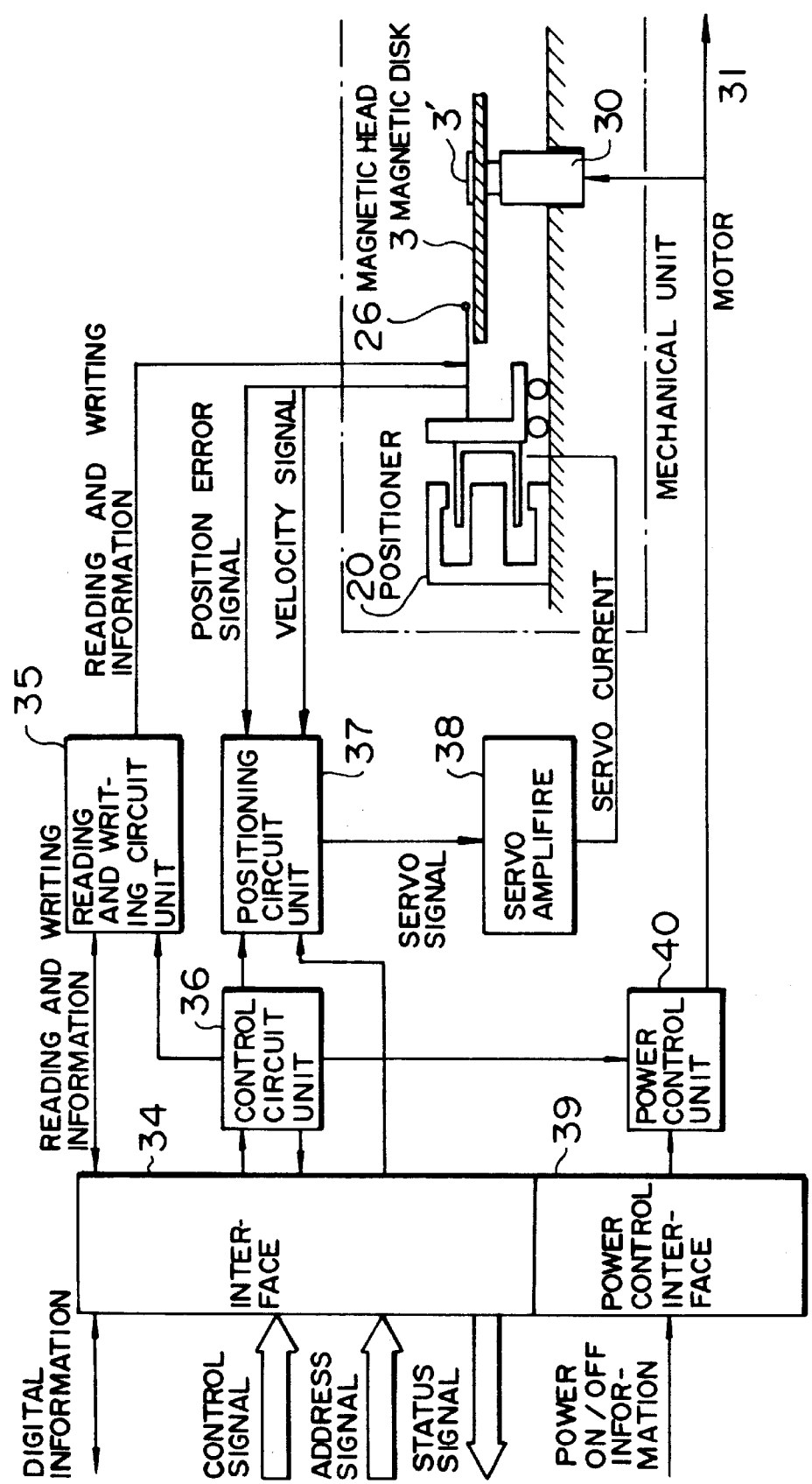
FIG. 8 is a diagram showing the configuration of a magnetic disk unit according to the fifth embodiment of the invention.

A fifth embodiment of the invention is shown in FIG. 8.

FIG. 8 is a block diagram of the invention. First, power on/off information is supplied to a power control unit 40 through a power control interface 39, so that a plurality of disk drive motors 30, 31, . . . are rotationally driven in a temporally sequential order. The control circuit 36 controls a digital information writing and reading circuit 35 and a circuit 37 for positioning the magnetic head 26 on the basis of a control signal, an address or the like supplied from an external source through an interface 34. The positioning circuit 37 applies a servo signal to a servo amplifier 38 on the basis of a position signal and a velocity signal generated on the basis of the positioning information or the like of the magnetic disk. The magnetic head 26 is thus positioned at a predetermined radial point on the disk by means of the head positioner 20.

In the case where the disk rotation is started or stopped as instructed by the user is possible. For example, the motors for driving the disks are prioritized for operation by the control circuit 36 through the power control circuit 40 in accordance with an external information read or write instruction. As a result, the disk first to be accessed following the state of the disk rotation being stopped, what is called the sleep mode is always activated in priority. The quick rotational activation thus is made possible without increasing the power consumption.

According to the present invention, there is provided a magnetic disk unit of 1.8-inch form factor size, which is small in power consumption, short in average seek time and high in performance.

The recording density of at least 1000 Mb (megabits)/in$^2$ or more is possible for the magnetic disk. In the case using two 1.3-inch disks, the recording capacity of 250 MB (megabytes) or more is possible for the unit as a whole.

What is claimed is:

1. A small memory unit with a hard disk comprising a housing having a predetermined single size corresponding to a PCMCIA form factor for a single hard disk having a predetermined diameter, a plurality of magnetic disks each having a diameter smaller than said predetermined diameter, a plurality of spindles for supporting and rotating said magnetic disks, a plurality of magnetic heads arranged face to face with the magnetic disk surfaces for writing and reading signals, at least one positioner for holding and setting the magnetic heads in position, and a housing for accommodating the foregoing components, wherein a plurality of the magnetic disks are arranged in the same plane without being overlapped with each other in said housing, wherein the size of said larger magnetic disk having a predetermined data area is 1.8 inch, and two 1.3-inch magnetic disks are arranged in a plane in a housing intended for said 1.8-inch disk.

2. A small memory unit according to claim 1, further comprising a pair of spindle motors for sequentially starting a pair of spindles supporting the two 1.3 inch magnetic disks.

3. A small memory unit according to claim 2, further comprising control means for rotating one of the 1.3 inch magnetic disks having data corresponding to a predetermined address before starting rotation of the other of the 1.3 inch magnetic disks.

4. A small memory unit according to claim 1, further comprising electric circuits provided within the housing.

5. A small memory unit according to claim 4, wherein the electric circuits include at least one of a reading circuit, a writing circuit and a control circuit.

6. A small memory unit according to claim 1, wherein one of the two 1.3 inch magnetic disks rotates in opposite direction to the other of the two 1.3 inch magnetic disks.

7. A small unit with a hard disk comprising a housing having a predetermined single size corresponding to a PCMCIA form factor for a single hard disk having a predetermined diameter, a plurality of magnetic disks each having a diameter smaller than said predetermined diameter, a plurality of spindles for supporting and rotating said magnetic disks, a plurality of magnetic heads arranged face to face with the magnetic disk surfaces for writing and reading signals, and at least one positioner for holding and positioning said magnetic heads, wherein said magnetic disks smaller than said single hard disk have a total data area on one side thereof equal to the data area of said single hard disk on one side thereof and are arranged in a plane in said housing, wherein the diameter of said single hard disk is 1.8 inch, and wherein said plurality of magnetic disks comprise two 1.3-inch magnetic disks.

* * * * *